UNITED STATES PATENT OFFICE.

ALBERT F. STEVENSON, OF RIDGEWOOD, NEW JERSEY, ASSIGNOR TO ALBERT W. JOHNSTON, OF NEW YORK, N. Y.

MANUFACTURE OF MILK-FAT.

1,397,664.  Specification of Letters Patent.  Patented Nov. 22, 1921.

No Drawing.   Application filed April 27, 1920. Serial No. 376,986.

*To all whom it may concern:*

Be it known that I, ALBERT F. STEVENSON, a citizen of the United States of America, residing at Ridgewood, in the county of Bergen and State of New Jersey, have invented certain new and useful Improvements in the Manufacture of Milk-Fat, of which the following is a full, clear, and exact description.

In an application for Letters Patent filed by myself and others on June 26, 1919, Serial No. 306,808, there is set forth a process of obtaining pure milk fat from milk, the general nature of which should be known in order to clearly understand the improvement on such process, which constitutes the subject of this application.

In said process, so far as it is necessary to the present case to state, whole milk is separated by the ordinary process and as much as possible of the cream recovered. The more essential steps of the process, beginning with this cream, consist in diluting such cream with a body of water, approximately equal in volume to the original milk fluid, and subjecting this mixture to a second step of separation by means of any ordinary centrifugal separator. The resulting product may be again diluted with water if necessary, and again passed through a separator, or in lieu of its dilution a second time with pure water, an acidulated water may be used, and after separation of this solution and the removal of the acid an anhydrous milk fat of great purity and free from bacteria is obtained.

These are in general the steps followed, and the object of the dilution with water and the final dilution with acidulated water is to increase the surface tension of the milk serum, and also to dissolve out the casein so that the pure milk fat becomes more readily separable.

In actual practice farmers and dairymen separate their cream from milk and send the cream periodically to the creameries or butteries so that it usually becomes sour before it is churned. This in no way interferes with its value as a material for the manufacture of high grade butter, but it has been found that such cream does not yield as readily and completely to our process of recovering the pure milk fat as does the freshly separated or sweet cream. It is highly important to meet these actual conditions in the supply of cream and to overcome the objections which seem to exist in treating sour cream, and this I have succeeded in doing.

I have discovered that sour cream may be treated by the process above described to better advantage and with an increased yield of pure milk fat if it be diluted with acidulated water as a step preliminary to its subsequent treatment according to the process above described, and upon this discovery my present application is based.

In carrying out the process, I take sour cream and dilute it in an equal volume of water which has been acidulated to such an extent that the resulting mixture has a hydrogen ion concentration of approximately $P_h = 3.0$. This degree of acidity when tested with the indicator bromphenol-blue, gives a greenish yellow color which is decidedly more yellow than green and is sufficient to redissolve the precipitated casein in the mixture.

The actual amount of acid or acid salt which is required to give this result depends upon the nature of the acid itself, upon the nature and the acidity of the cream, and, to some extent, upon the chemical composition of the water employed for the dilution, and it is therefore difficult to define. For illustrative purpose, however, it may be stated that I have found that a twenty five per cent. cream that has been soured naturally to about the maximum degree, requires the addition of 49 cubic centimeters of normal hydrochloric acid per pound of cream.

This acidulated mixture is then diluted with hot water until the resulting mixture has a milk fat content of about 3.5 per cent. and a temperature of about 125° F. This mixture is then treated in the same way as milk in the process which I have above outlined. In other words it is passed through a centrifugal separator, the recovered product then diluted with acidulated water and again subjected to separation, and after being freed from traces of acid will be found to be a pure anhydrous milk fat, free from all bacterial content.

The purpose of the initial treatment with acidulated water, as has been stated, is to dissolve the precipitated casein. It is obvious, therefore, that the hydrogen ion concentration is the essential and controlling factor and that any of the common acids or acid salts may be employed. It is equally obvious that the extent of the dilution and the temperature above stated are illustrative only and may be materially modified without departing from the fundamental principle of the invention.

What I claim is—

1. In the process of recovering pure milk fat from sour cream, the initial step in the treatment of the cream, which consists in diluting the same with acidulated water of such a degree of acidity as to give to the mixture a hydrogen ion concentration sufficient to re-dissolve the precipitated casein.

2. The process of recovering pure milk fat from sour cream which consists in diluting the cream with acidulated water of sufficient acidity to re-dissolve the precipitated casein, then further diluting the mixture with warm water, and then recovering the milk fat therefrom by the process hereinbefore described.

3. The process of recovering pure milk fat from sour cream, which consists in diluting the cream with acidulated water to re-dissolve the precipitated casein, further diluting the mixture with water, separating out the fat, again diluting the product with acidulated water, and separating out from the mixture the pure milk fat.

In testimony whereof I hereto affix my signature.

ALBERT F. STEVENSON.